(12) United States Patent
Ackermann et al.

(10) Patent No.: US 11,514,095 B2
(45) Date of Patent: Nov. 29, 2022

(54) TIERED RETRIEVAL OF SECURED DOCUMENTS

(71) Applicant: International Business Machines Corporation, Armonk, NY (US)

(72) Inventors: Christopher F. Ackermann, Fairfax, VA (US); Michael Drzewucki, Woodbridge, VA (US); Charles E. Beller, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 15/971,271

(22) Filed: May 4, 2018

(65) Prior Publication Data
US 2019/0340297 A1    Nov. 7, 2019

(51) Int. Cl.
*G06F 16/34* (2019.01)
*G06F 21/62* (2013.01)
(Continued)

(52) U.S. Cl.
CPC .......... *G06F 16/345* (2019.01); *G06F 16/338* (2019.01); *G06F 16/35* (2019.01); *G06F 16/93* (2019.01); *G06F 21/6209* (2013.01)

(58) Field of Classification Search
CPC ........ G06F 16/345; G06F 16/93; G06F 16/35; G06F 16/338; G06F 21/6209
See application file for complete search history.

(56) References Cited

U.S. PATENT DOCUMENTS 6,006,228 A    12/1999    McCollum et al.
7,283,997 B1    10/2007    Howard, Jr. et al.
(Continued)

FOREIGN PATENT DOCUMENTS

WO    2010141799 A2    12/2010

OTHER PUBLICATIONS

Pengjie Ren et al., "Mining and ranking users' intents behind queries", Oct. 9, 2015, pp. 504-529.
(Continued)

*Primary Examiner* — Apu M Mofiz
*Assistant Examiner* — Husam Turki Samara
(74) *Attorney, Agent, or Firm* — Monchai Chuaychoo; Hunter E. Webb; Keohane & D'Alessandro, PLLC

(57) ABSTRACT

Approaches presented herein enable presenting, as an initial response to a search query from a user, a set of analytic summaries prior to initiating a document security protocol in a secured document environment. Each analytic summary represents a set or cluster of documents. A summary relevance value is calculated for each analytic summary and a document relevance value is calculated for each individual document. Analytic summaries are presented to the user while each document within each analytic summary are prioritized for a security review based on its related summary relevance value and document relevance value. Based on the priorities, a security review is initiated for the documents so that a highly relevant document within an analytic summary undergoes the security review before a less relevant document. Access to a particular document is granted to the user according to the security review of the document.

20 Claims, 5 Drawing Sheets

(51) Int. Cl.
*G06F 16/35* (2019.01)
*G06F 16/93* (2019.01)
*G06F 16/338* (2019.01)

(56) References Cited

U.S. PATENT DOCUMENTS

| | | |
|---|---|---|
| 7,515,717 B2 | 4/2009 | Doyle et al. |
| 7,685,645 B2 | 3/2010 | Doyle et al. |
| 7,849,077 B2 | 12/2010 | Liao et al. |
| 8,495,483 B1 | 7/2013 | Dean et al. |
| 8,577,901 B2 | 11/2013 | Dean et al. |
| 2005/0055341 A1* | 3/2005 | Haahr ................. G06F 16/3326 |
| 2008/0033954 A1* | 2/2008 | Brooks ................. G06F 16/328 |
| 2009/0198667 A1* | 8/2009 | Groeneveld ........ G06F 16/9535 |
| 2010/0332491 A1 | 12/2010 | Cui et al. |
| 2011/0202886 A1* | 8/2011 | Deolalikar ............ G06F 16/353 |
| | | 715/853 |
| 2016/0140516 A1* | 5/2016 | Schneider .......... G06Q 10/0875 |
| | | 705/343 |

OTHER PUBLICATIONS

Peter Bailey et al., "Secure Search in Enterprise Webs: Tradeoffs in Efficient Implementation for Document Level Security", CIKM'06, Nov. 5-11, 2006, Arlington, Virginia, Copyright 2006 ACM, pp. 493-502.

\* cited by examiner

US 11,514,095 B2

TIERED RETRIEVAL OF SECURED DOCUMENTS

TECHNICAL FIELD

The subject matter of this invention relates generally to document retrieval. More specifically, aspects of the present invention provide a solution for presenting, as an initial response to a search query from a user, a set of analytic summaries prior to initiating a document security protocol in a secured document environment.

BACKGROUND

Document retrieval is defined as the matching of some stated user query against a set of free-text records. These records may be any type of mainly unstructured text, such as newspaper articles, real estate records, or paragraphs in a manual. User queries can range from multi-sentence full descriptions of an information need to a few words. Document retrieval is sometimes referred to as, or as a branch of, text retrieval. Text retrieval is a branch of information retrieval where the information is stored primarily in the form of text. Text retrieval is a critical area of study today, since it is the fundamental basis of all internet search engines. In some instances, the underlying text documents may require security to limit access to valid users. Access controls may be used to restrict specific operations such as the reading, writing, sending, and/or duplication of content. For example, a server may require authentication of a user requesting access to a document and then look up the user's credentials in an access control list to determine whether to provide the document and, if so, what operations the user is allowed to perform on it. However, security management is not just about keeping people from accessing information they shouldn't. It is also about efficiently providing access to the data people need.

SUMMARY

In general, embodiments of the present invention provide for presenting, as an initial response to a search query from a user, a set of analytic summaries prior to initiating a document security protocol in a secured document environment. Each analytic summary represents a set or cluster of documents. A summary relevance value is calculated for each analytic summary and a document relevance value is calculated for each individual document. Analytic summaries are presented to the user while each document within each analytic summary is prioritized for a security review based on its related summary relevance value and document relevance value. Based on the priorities, a security review is initiated for the documents so that a highly relevant document within an analytic summary undergoes the security review before a less relevant document.

One aspect of the present invention includes a method for deriving access for a user to a document from a document collection, the method comprising: generating, in response to a search query, a set of analytic summaries, wherein each analytic summary includes a set of documents from the document collection; calculating a summary relevance value for each analytic summary; presenting, to the user on a display, each analytics summary ordered according to the analytic relevance values; and initiating, once the analytics summaries are presented, a security review for each document according to a predefined priority.

Another aspect of the present invention includes a computer program product embodied in a computer readable medium that, when executed by a computer device, performs a method for deriving access for a user to a document from a document collection, the method comprising: generating, in response to a search query, a set of analytic summaries, wherein each analytic summary includes a set of documents from the document collection; calculating a summary relevance value for each analytic summary; presenting, to the user on a display, each analytics summary ordered according to the analytic relevance values; and initiating, once the analytics summaries are presented, a security review for each document according to a predefined priority.

Yet another aspect of the present invention includes a system for deriving access for a user to a document from a document collection, comprising: a memory medium comprising instructions; a bus coupled to the memory medium; and a processor coupled to the bus that when executing the instructions causes the system to perform a method, comprising: generating, in response to a search query, a set of analytic summaries, wherein each analytic summary includes a set of documents from the document collection; calculating a summary relevance value for each analytic summary; presenting, to the user on a display, each analytics summary ordered according to the analytic relevance values; and initiating, once the analytics summaries are presented, a security review for each document according to a predefined priority.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
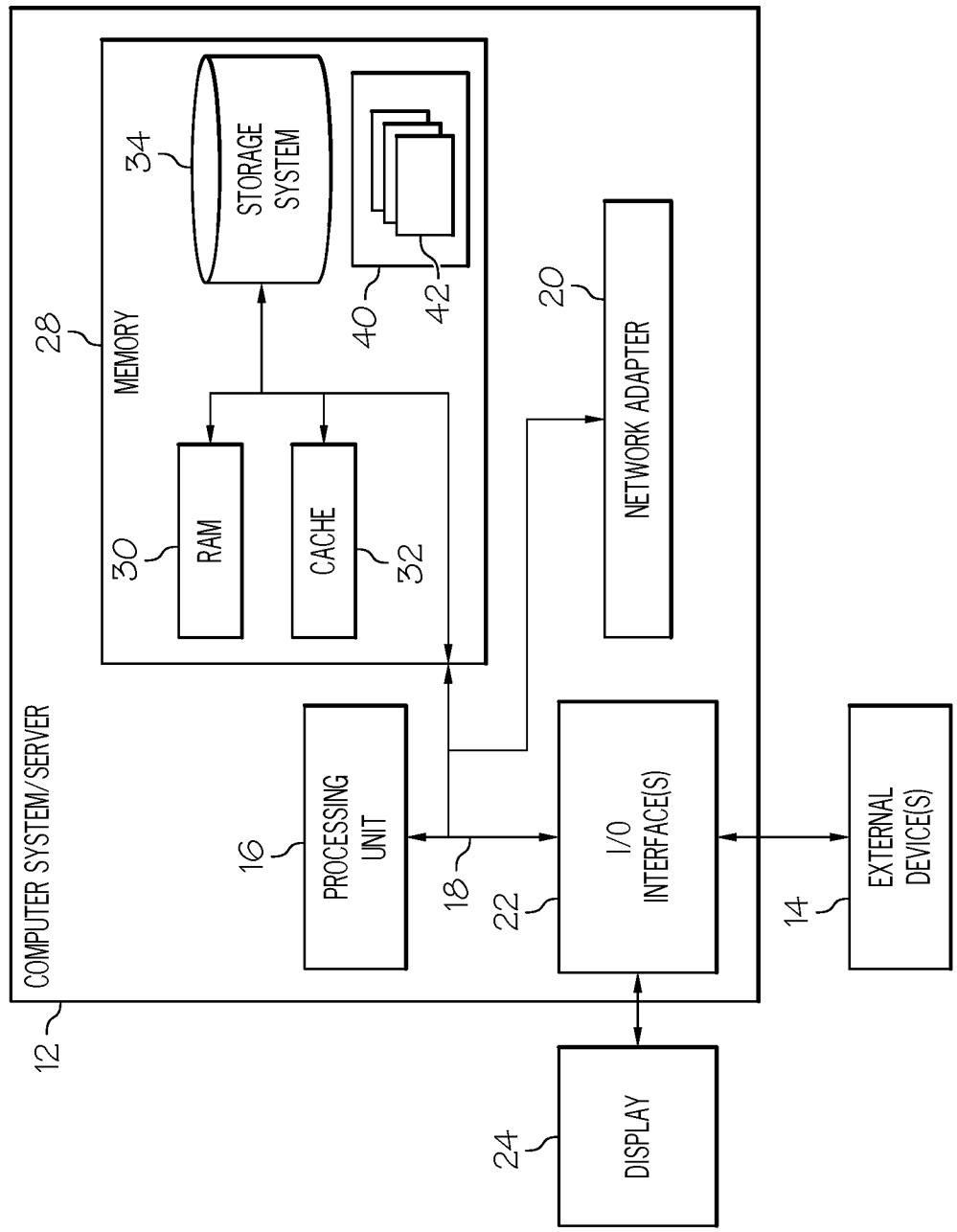
FIG. 1 shows an architecture 10 in which the invention may be implemented according to an illustrative embodiment of the present invention.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing", "detecting", "determining", "evaluating", "receiving", or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context.

As stated above, embodiments of the present invention provide for presenting, as an initial response to a search query from a user, a set of analytic summaries prior to initiating a document security protocol in a secured document environment. Each analytic summary represents a set or cluster of documents. A summary relevance value is calculated for each analytic summary and a document relevance value is calculated for each individual document. Analytic summaries are presented to the user while each document within each analytic summary is prioritized for a security review based on its related summary relevance value and document relevance value. Based on the priorities, a security review is initiated for the documents so that a highly relevant document within an analytic summary undergoes the security review before a less relevant document.

Typically, results from a search query in a secured document environment are only presented to a user after a predefined security process has completed. Separating out the generating/presenting results from a document security layer allows information (e.g., one or more analytics summaries) to be provided to a user more quickly. Also, by performing a security review of each document based on one or more calculated relevance values ensures that a document that is more likely to be selected by the user will be available sooner than another document that the user is less likely to select, further increasing the user's efficiency by eliminating unnecessary wait time.

Referring now to FIG. 1, a computerized implementation 10 of an embodiment for presenting, as an initial response to a search query from a user, a set of analytic summaries prior to initiating a document security protocol in a secured document environment will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for presenting, as an initial response to a search query from a user, a set of analytic summaries prior to initiating a document security protocol in a secured document environment. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for presenting, as an initial response to a search query from a user, a set of analytic summaries prior to initiating a document security protocol in a secured document environment, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
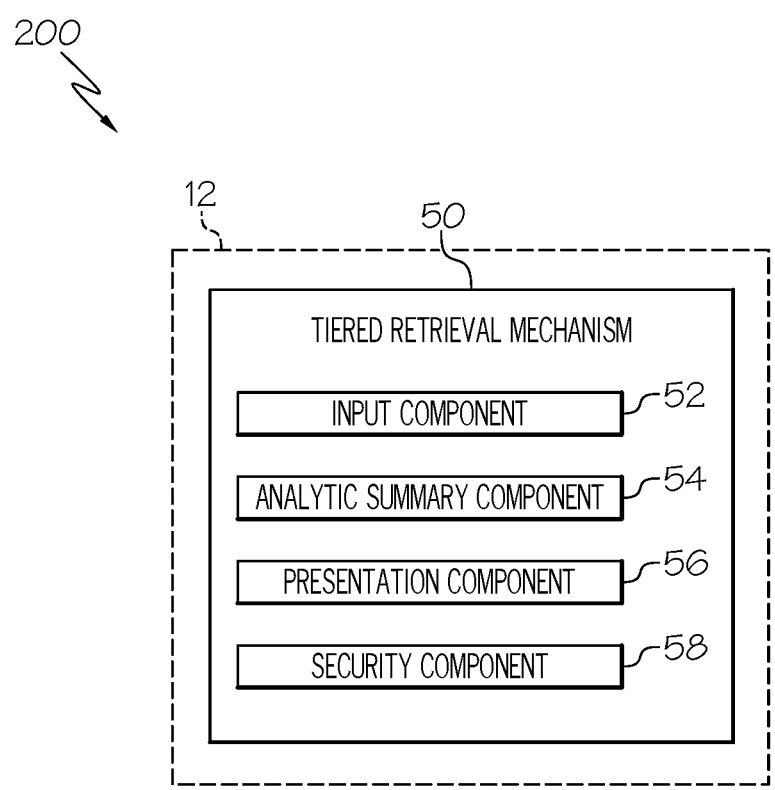
FIG. 2 shows a first schematic diagram 200 illustrating an exemplary environment for implementation according to an illustrative embodiment of the present invention.

Referring now to FIG. 2, a block diagram 200 describing the functionality discussed herein according to an embodiment of the present invention is shown. It is understood that the teachings recited herein may be practiced within any type of computing environment (e.g., computer system 12). To this extent, the teachings recited herein may be practiced within a stand-alone computer system or within a networked computing environment (e.g., a client-server environment, peer-to-peer environment, distributed computing environment, cloud computing environment, and/or the like). If the teachings recited herein are practiced within a networked computing environment, each physical server need not have a tiered retrieval mechanism 50 (hereinafter "system 50"). Rather, system 50 could be loaded on a server or server-capable device that communicates (e.g., wirelessly) with the physical server for presenting, as an initial response to a search query from a user, a set of analytic summaries prior to initiating a document security protocol in a secured document environment.

Regardless, as depicted, system 50 can be implemented as program/utility 40 on computer system 12 of FIG. 1 and can enable the functions recited herein. It is further understood that system 50 can be incorporated within or work in conjunction with any type of system that receives, processes, and/or executes commands with respect to IT resources in a networked computing environment. Such other system(s) have not been shown in FIG. 2 for brevity purposes. As shown, tiered retrieval mechanism 50 includes input component 52, analytic summary component 54, presentation component 56, and security component 58. The functions/acts of each component is described in detail below.

Figure 3:
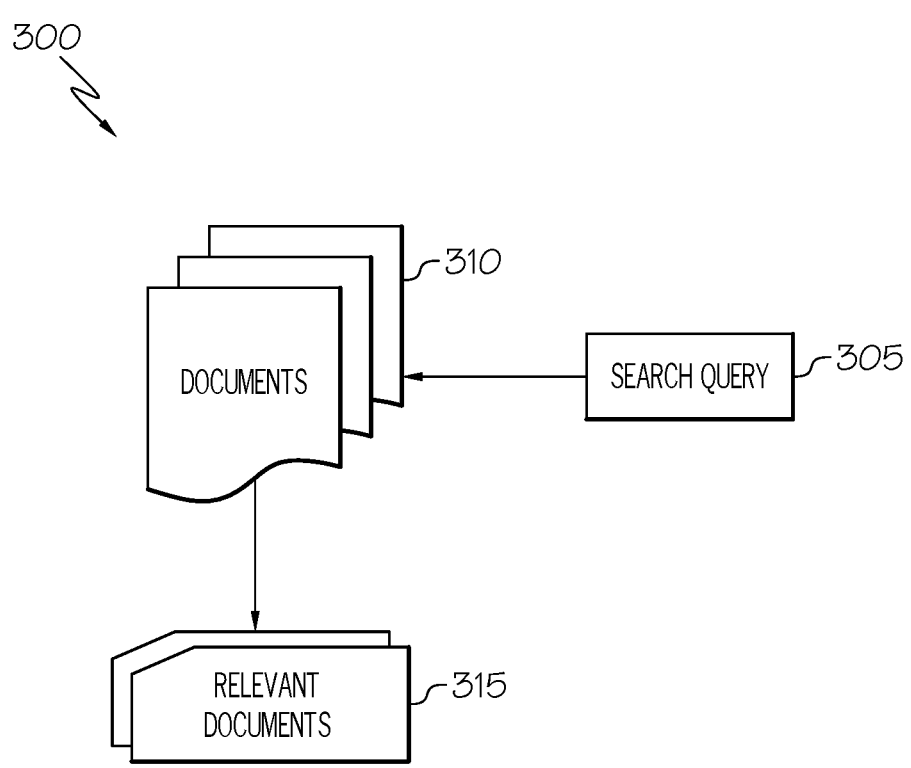
FIG. 3 shows an example document retrieval system 300 according to an illustrative embodiment of the present invention.

FIG. 3 shows an example document retrieval system 300. A typical document retrieval system finds information (e.g., relevant documents 315) in response to given criteria by matching text records (documents) against a user search query 305, as opposed to expert systems that answer questions by inferring over a logical knowledge database. The document retrieval system 300 may consist of a database of documents 310 and a user interface to access the database. Tasks for document retrieval system 300 typically include finding relevant documents to user queries and evaluating the matching results and sorting them according to relevance. Also, each document in the database 310 may be assigned a level of document protection (or security level) such that a particular user may not be allowed to access to one or more documents in database 310. A document security process must also be followed to ensure that a user is granted access only to those documents in which the user has adequate access rights. In any case, it is important to manage the related retrieval method efficiently to decrease a user's wait time in receiving results related to the user's search query.

Input component 52 of system 50, as executed by computer system/server 12, is configured to receive a search query as input. A search query is a word or set of words that are input via a text input interface (e.g., a search bar) using an input device, such as a keyboard, touch panel, etc. For example, input component 52 may receive search query "Michael Jordan" entered by a user into a search bar using a keyboard. In an embodiment, a search query may be used to search unstructured data, such as a collection of unstructured text documents. Examples of unstructured data may include books, journals, documents, metadata, health records, audio, video, analog data, images, files, and/or unstructured text such as the body of an email message, Web page, and/or word-processor document. In another embodiment, other types of data (e.g., structured, semi-structured, etc.) may be searched based on the search query. In any case, input component 52 receives a search query as input to satisfy a user's information needs.

Analytic summary component 54 of system 50, as executed by computer system/server 12, is configured to find, based on a search query, relevant results from a collection of stored data and generate a set of analytic summaries. In an embodiment, the collection of stored data may consist of a set of unstructured text documents. The unstructured text documents may reside in one or more document databases. Analytic summary component 54 can find documents that are relevant to a received search query, evaluate the matching results, and present the results to the user as any number of analytic summaries (discussed below).

In an embodiment, analytic summary component 54 can perform a search using any now known or later developed search techniques such as compound term processing, document classification, enterprise search, full text search, and/or the like. Analytic summary component 54 can also employ any now known or later developed more advanced search techniques such as expanding a user's search terms provided in the search query to include acronym expansions, various spelling differences, synonyms and/or other strongly related terms, and/or the like. In any case, analytic summary component 54 is configured to generate, based on a provided search query, an analytic summary from a collection of stored data.

Figure 4:
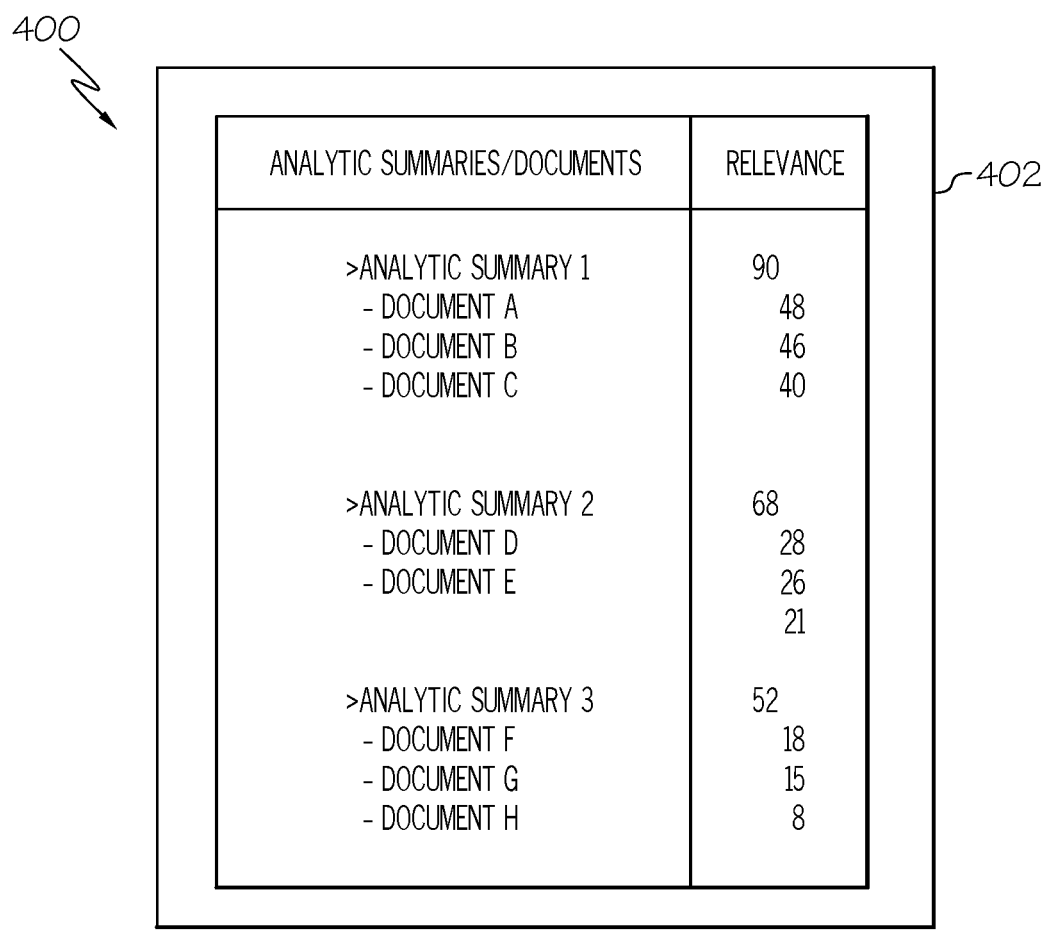
FIG. 4 shows and example display screen 400 include analytic summaries according to an illustrative embodiment of the present invention.

Analytic summaries are more structured than a single ranked list of search results. Each analytic summary itself can represent a set or cluster of documents. FIG. 4 shows an example display screen 402 including a set of analytic summaries. Each analytic summary may include any number of supporting documents. For example, for search query 'Michael Jordan', several analytic summaries may be generated. To that end, a first analytic summary that covers the documents pertaining to Michael Jordan the basketball player may be generated. A second representing another set of documents pertaining to Michael B. Jordan the actor may also be generated. In addition, a third analytic summary pertaining to Michael Jordan the computer scientist may be generated, and so on.

A summary relevance value is calculated for each analytic summary (i.e., document cluster). Summary relevance values can be calculated based on a predefined algorithm. For example, a summary relevance value may be an integer ranging from 50 to 100. Higher relevance values indicate an analytic summary (or cluster) that better matches the search conditions. Summary relevance values may apply only to the current query, so they cannot be compared for results across queries. Summary relevance values are relative to the other clusters matching the query. Therefore, the relevance value of a particular analytic summary depends on the other analytic summaries that also match the query.

In addition, a document relevance value is calculated for each individual document within the analytic summaries. In an embodiment, document relevance values may operate similarly to summary relevance values. Document relevance values may be calculated based on a predefined algorithm and/or one or more factors. For example, term frequency, inverse term frequency, and/or field-length norm may be factors that are considered when calculating a document relevance value. Term frequency refers to how often a search query appears in the particular document. The more often it appears, the higher the relevance value. How often the search query appears in all documents in a collection can also be evaluated (i.e., inverse term frequency). The more often, the lower the relevance value. Common terms such as 'and' or 'the' contribute little to relevance, while uncommon terms such as 'elastic' and 'hippopotamus' help zoom in on the most relevant documents. Field-length norm refers to the length of the field where the search query was located. If the search query appears in a short field, such as a title field, the more likely the content of the field is about the search query than if the same search query appears in a larger body field. The factors listed above are exemplary only and not intended to be limiting. Other factors and/or algorithms now known or later developed may be used in deriving document relevance values.

A document relevance value may be represented by a numerical weighted value. For example, a document relevance value may be an integer ranging from 1 to 49. Higher relevance values indicate documents within an analytic summary (or cluster) that better match the search conditions. Document relevance values may apply only to the current query, so they cannot be compared for results across queries. Document relevance values are relative to the other documents matching the query. Therefore, the relevance value of a particular document depends on the other documents that also match the query.

In an embodiment, analytic summaries are sorted based on the calculated summary relevance values so that more relevant analytic summaries are listed at the top when presented to a user, as shown in FIG. 4. Likewise, documents within a particular analytic summary may also be sorted based on derived document relevance values. A predefined threshold value may also be provided (e.g., by a user) so that only analytic summaries/documents having a relevance value higher than the threshold (e.g., higher than 75 on a 50:100 scale for analytic summaries) are displayed to the user.

The derived relevance values may be used to determine priority when managing documents through a predefined security protocol so that a highly relevant document within an analytic summary may undergo a security protocol first, while a less relevant document from a highly analytic summary can still be processed before a second less relevant document from a less relevant analytic. For example, Document A of Analytic Summary 1 undergoes a security review before Document B. Likewise, Document A will undergo its security review before any documents in Analytic Summary 2 and Analytic Summary 3. The security review process of a particular document is performed to determine a level of access (e.g., read access) of the document that has been granted to the user. The benefit of performing the security review for Document A before Document B allows a user to access Document A, given the user has been granted access privileges, with less delay because the user does not have to wait for subsequent security reviews of documents deemed likely less relevant to the user.

It will be appreciated by those skilled in the art that data searched for a particular query may take any form and need not be in the form of a text document. Instead, searched data may include other forms of information such as images, video, and audio, which may all be reduced to text searchable media using techniques known in the art.

Analytic summary component 54 of system 50, as executed by computer system/server 12, is further configured to detect whether a previously generated analytic summary exists in the cache for a particular search query. A cache is a hardware or software component that stores data so future requests for that data can be served faster. The data stored in a cache might be the result of an earlier computation, or the duplicate of data stored elsewhere. In an embodiment, a document database (or other repository) may include a cache for storing analytic summaries corresponding to previously processed search queries. A predefined method may be used for storing and retrieving analytic summaries from the cache. For example, each analytic summary stored in the cache may contain at least a search query identifier related to the search query and a document identifier for each document related to the analytic summary.

A first determination is made as to whether the search query identifier already exists in the cache (i.e., whether the cache already stores any analytic summaries for the received search query). If the search query identifier does not already exist in the cache, the method discussed earlier is used to generate one or more analytic summaries for the provided search query to be presented to the user. In another embodiment, a different method may be used to detect whether any analytic summaries related to a search query already exist in the cache. In any case, if a previously generated analytic summary is detected in the cache, the analytic summary can be quickly presented to the user without performing the analytic summary generation method already discussed.

Presentation component 56 of system 50, as executed by computer system/server 12, is configured to display, as an initial response to a search query from a user, any number of analytic summaries to the user on a display screen of an electronic device (e.g., a smartphone, personal computer, laptop, etc.). Presentation component 56 may display the analytics summaries to the user, whether one or more analytic summaries are first generated using the analytic summary generation method discussed above or retrieved from the cache. Each analytics summary may be presented including any number of supporting documents. Each supporting document may include a title, a link that points to the document (or other object such as video, audio, etc., which has been reduced to searchable text), a short description showing where the words in the search query have matched content within the document/text, and/or the like.

Security component 58 of system 50, as executed by computer system/server 12, is configured to prioritize, based on a ranked order of relevance, the supporting documents listed in an analytics summary for a security review. Based on the prioritization, a predefined document security protocol can be applied to each document listed in each analytic summary. Typically, results in a secured document environment are only presented to a user after the security process has completed. Separating out the generating/presenting results from a document security layer allows information (i.e., the analytics summary) to be provided to a user more quickly whether any analytic summaries are first generated using the summary generation method discussed above or retrieved from cache.

In an embodiment, each document listed in an analytics summary may be vetted in a particular order, such as an order based on derived relevance values (e.g., summary relevance and/or document relevance value) used for determining a sorted order of results. The vetting process may begin once each analytic summary has been generated and displayed to a user. It can be assumed that a first document having a higher relevance value(s) than a second document should be vetted prior to the second document because it is more likely that a user will attempt to request (e.g., click on the link) the first document than the second document. If the user has access privileges (e.g., read access) to a selected document, then the user will be able to access the document (e.g., open the document for reading) upon requesting it. In contrast, the user may have limited access to a particular document based on the user's access privileges.

Document security management is a way to maintain the integrity of data and to make sure that the data is not accessible by unauthorized parties or susceptible to corruption of data. Document security is put in place to ensure privacy in addition or protecting this data. Securing stored data involves preventing unauthorized people from accessing it as well as preventing accidental or intentional destruction, infection, or corruption of information. Sensitive data may be identified with appropriate access controls put in place when necessary. Access controls are used to restrict specific operations such as the reading, writing, sending, and duplication of content. As an example of access controls, a server may require authentication of a user requesting access to a document and then look up the user's credentials in an access control list to determine whether to provide the document and, if so, what operations the user is allowed to perform on it. However, document security management is not just about keeping people from accessing information they shouldn't. It is also about efficiently providing access to the data people need. Vetting documents in an order based on derived relevance values provides documents determined more likely to be requested to be made available earlier than documents determined less likely to be requested resulting in less wait time for the user.

Figure 5:
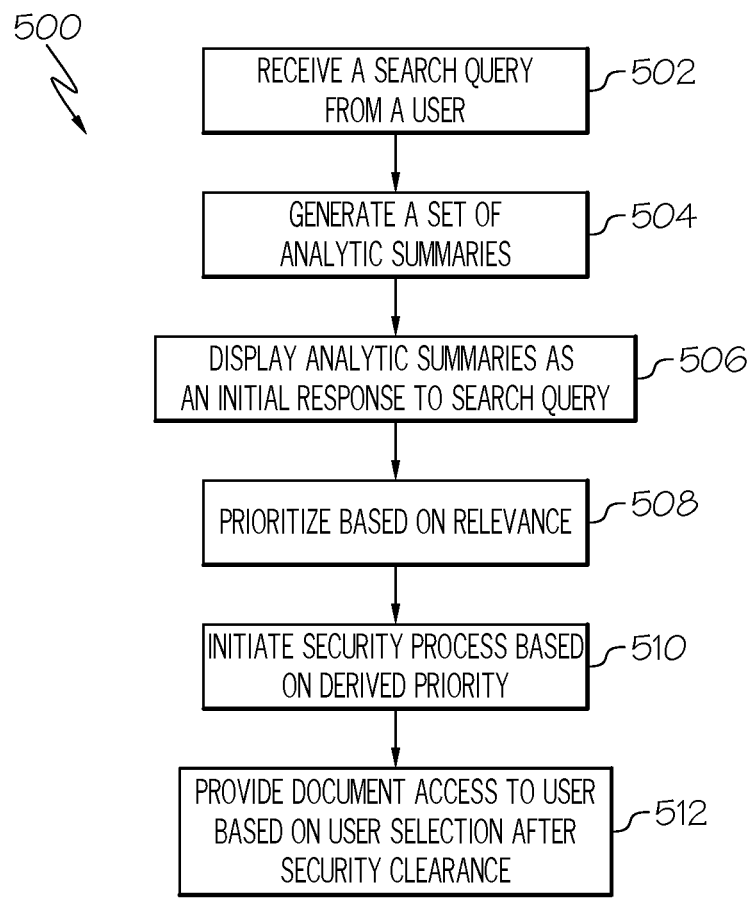
FIG. 5 shows a process flowchart 500 for deriving access for a user to a document from a document collection according to an illustrative embodiment of the present invention.

Referring now to FIG. 5, in conjunction with FIG. 2, an implementation of a process flowchart 500 for presenting, as an initial response to a search query from a user, a set of analytic summaries prior to initiating a document security protocol in a secured document environment is shown. At 502, input component 52 receives a search query from a user. At 504, analytic summary component 54 generates a set of analytics summaries ordered by relevance after calculating a summary relevance value for each analytic summary. Also, each supporting document within the analytic summaries is assigned a document relevance value. Analytic summary component 54 detects whether a previously generated analytic summary exists in the cache for a particular search query. If so, the analytic summary in the cache will be used. Otherwise, the analytic summary will be generated based on the process described prior. Presentation component 56 displays the set of analytics summaries as an initial response to the search query, at 506.

At 508, security component 58 prioritizes the supporting documents listed in each analytics summary based on the calculated relevance values which were used to order analytic summaries/documents. At 510, the supporting documents undergo a security review, in priority order, based on user credentials to determine the user's level of access to each document. At 512, presentation component 56 provides document access to the user after the security review for the document has completed. For example, a particular document may be displayed to the user in read-only access mode when the user has read-only access to the document.

Process flowchart 500 of FIG. 5 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the Figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for presenting, as an initial response to a search query from a user, a set of analytic summaries prior to initiating a document security protocol in a secured document environment. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for presenting, as an initial response to a search query from a user, a set of analytic summaries prior to initiating a document security protocol in a secured document environment. In this case, the service provider can create, maintain, support, etc., a computer infrastructure that performs the process steps of the invention for one or more consumers. In return, the service provider can receive payment from the consumer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network and/or a wireless network). The network may comprise copper transmission cables, optical transmission fibers, wireless transmission, routers, firewalls, switches, gateway computers and/or edge servers. A network adapter card or network interface in each computing/processing device receives computer readable program instructions from the network and routes the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an document of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches for presenting, as an initial response to a search query from a user, a set of analytic summaries prior to initiating a document security protocol in a secured document environment. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for deriving access for a user to a document from a document collection, the method comprising:
   automatically generating, in response to a search query, a set of analytic summaries, wherein each analytic summary includes of a set of documents from the document collection;
   calculating a summary relevance value for each analytic summary;
   presenting, to the user on a display, each analytics summary together with associated documents, the set of analytics summaries being ordered according to corresponding relevance summary values; and
   initiating, once the analytics summaries and associated documents are presented, security reviews for the documents according to a predefined priority determined according to the related summary relevance values such that security reviews are completed faster for documents associated with higher ordered analytic summaries and higher ranked documents are made available for access by the user earlier than lower ranked documents.

2. The method of claim 1, further comprising retrieving an analytics summary among the set of analytic summaries from a cache for presenting to the user.

3. The method of claim 1, further comprising generating an analytics summary among the set of analytic summaries using a predefined search technique.

4. The method of claim 1, further comprising enabling each individual document for display to the user upon completion of the security review for the individual document, wherein every document is available for display in the set of analytics summaries after security reviews have been completed for all documents regardless of whether the user has security for any document being displayed.

5. The method of claim 1, wherein each analytic summary reflects a different definitional meaning of search terms in the search query, and
   wherein each document retrieved from the document collection in response to the search query is assigned to an analytic summary that has a definitional meaning that corresponds to a definitional meaning of the search terms in the document.

6. The method of claim 1, further comprising retrieving security credentials related to the user to be used in the security review.

7. The method of claim 1, further comprising:
   obtaining a threshold value,
   wherein only analytic summaries having a summary relevance value higher than the threshold value are displayed to the user, and
   wherein each analytics summary includes a link to each document in the set of documents.

8. A computer program product embodied in a computer readable storage device that, when executed by a computer device, performs a method for deriving access for a user to a document from a document collection, the method comprising:
   identifying, in response to a search query, a set of documents from the document collection;
   automatically generating, in response to the search query, a set of analytic summaries, wherein each analytic summary includes of a set of documents from the document collection;
   calculating a relevance value for each document in the set of documents;
   presenting, to the user on a display, each analytics summary together with associated documents, the set of analytics summaries being ordered according to corresponding relevance summary values; and
   initiating, once the analytics summaries and associated documents are presented, security reviews for the documents according to a predefined priority determined according to the related summary relevance values such that security reviews are completed faster for documents associated with higher ordered analytic summaries and higher ranked documents are made available for access by the user earlier than lower ranked documents.

9. The computer program product of claim 8, the method further comprising retrieving the analytics summary among the set of analytic summaries from a cache for presenting to the user.

10. The computer program product of claim 8, further comprising generating an analytics summary among the set of analytic summaries using a predefined search technique.

11. The computer program product of claim 8, further comprising enabling each individual document for display to the user upon completion of the security review for the individual document, wherein every document is available for display in the set of analytics summaries after security reviews have been completed for all documents regardless of whether the user has security for any document being displayed.

12. The computer program product of claim 8,
   wherein each analytic summary reflects a different definitional meaning of search terms in the search query, and
   wherein each document retrieved from the document collection in response to the search query is assigned to an analytic summary that has a definitional meaning that corresponds to a definitional meaning of the search terms in the document.

13. The computer program product of claim 8, further comprising retrieving security credentials related to the user to be used in the security review.

14. The computer program product of claim 8, further comprising:
   obtaining a threshold value,
   wherein only analytic summaries having a summary relevance value higher than the threshold value are displayed to the user, and
   wherein each analytics summary includes a link to each document in the set of documents.

15. A system for deriving access for a user to a document from a document collection, comprising:
   a memory medium comprising instructions;
   a bus coupled to the memory medium; and
   a processor coupled to the bus that when executing the instructions causes the system to perform a method, comprising:
      identifying, in response to a search query, a set of documents from the document collection;
      automatically generating, in response to the search query, a set of analytic summaries, wherein each analytic summary includes of a set of documents from the document collection;
      calculating a relevance value for each document in the set of documents;
      presenting, to the user on a display, each analytics summary together with associated documents, the set of analytics summaries being ordered according to corresponding relevance summary values; and
      initiating, once the analytics summaries and associated documents are presented, security reviews for the documents according to a predefined priority determined according to the related summary relevance values such that security reviews are completed faster for documents associated with higher ordered analytic summaries and higher ranked documents are made available for access by the user earlier than lower ranked documents.

16. The system of claim 15, the method further comprising retrieving an analytics summary among the set of analytic summaries from a cache for presenting to the user.

17. The system of claim 15, further comprising generating an analytics summary among the set of analytic summaries using a predefined search technique.

18. The system of claim 15, further comprising enabling each individual document for display to the user upon completion of the security review for the individual document, wherein every document is available for display in the set of analytics summaries after security reviews have been completed for all documents regardless of whether the user has security for any document being displayed.

19. The system of claim 15, the method further comprising:
    obtaining a threshold value,
    wherein only analytic summaries having a summary relevance value higher than the threshold value are displayed to the user.

20. The system of claim 15, the method further comprising retrieving security credentials related to the user to be used in the security review.

* * * * *